US007965653B2

(12) United States Patent
Finn

(10) Patent No.: US 7,965,653 B2
(45) Date of Patent: Jun. 21, 2011

(54) SYSTEM AND METHOD FOR REGISTERING AND UN-REGISTERING MEMBERSHIP IN VIRTUAL LOCAL AREA NETWORKS

(75) Inventor: Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 1880 days.

(21) Appl. No.: 10/671,084

(22) Filed: Sep. 25, 2003

(65) Prior Publication Data

US 2005/0080912 A1    Apr. 14, 2005

(51) Int. Cl.
*H04L 12/66* (2006.01)
*H04L 12/28* (2006.01)
(52) U.S. Cl. .................... 370/254; 370/351; 370/396
(58) Field of Classification Search .................. None
See application file for complete search history.

(56) References Cited

U.S. PATENT DOCUMENTS

| 4,281,391 | A | * | 7/1981 | Huang ..................... 708/491 |
| 5,394,402 | A | | 2/1995 | Ross |
| 5,742,604 | A | | 4/1998 | Edsall et al. |
| 5,959,989 | A | | 9/1999 | Gleeson et al. |
| 6,188,694 | B1 | | 2/2001 | Fine et al. |
| 6,515,969 | B1 | | 2/2003 | Smith |
| 6,813,250 | B1 | | 11/2004 | Fine et al. |
| 6,839,348 | B2 | | 1/2005 | Tang et al. |
| 7,089,302 | B1 | * | 8/2006 | Churchyard et al. ......... 709/224 |
| 2002/0087806 | A1 | * | 7/2002 | Gharachorloo et al. ...... 711/141 |
| 2003/0043806 | A1 | * | 3/2003 | Davis et al. ................. 370/395.1 |
| 2003/0177243 | A1 | * | 9/2003 | Collette et al. ................. 709/227 |
| 2003/0195893 | A1 | * | 10/2003 | Kasao et al. .................... 707/100 |
| 2004/0061773 | A1 | * | 4/2004 | Liu ............................. 348/14.02 |
| 2005/0036500 | A1 | * | 2/2005 | Rodeheffer et al. .......... 370/401 |
| 2005/0047570 | A1 | * | 3/2005 | Schmid et al. ................. 379/189 |

OTHER PUBLICATIONS

"Notification of Transmittal of the International Search Report and the Written Opinion of the International Searching Authority, or the Declaration" of International application No. PCT/US2004/031199 with an International filing date of Sep. 23, 2004.

(Continued)

*Primary Examiner* — Daniel J Ryman
*Assistant Examiner* — John Blanton
(74) *Attorney, Agent, or Firm* — Cesari and McKenna, LLP

(57) ABSTRACT

A system and method efficiently conveys Virtual Local Area Network (VLAN) membership information across a bridged network. In particular, an intermediate network device, such as a bridge, includes a plurality of ports for interconnecting entities of a computer network. For each port, a Generic Attribute Registration Protocol (GARP) participant is established that has a compact GARP VLAN Registration Protocol (GVRP) application component and a GARP Information Declaration (GID) component. The GID component operates a plurality of state machines to maintain registration state for all of the VLANs of which the port has been made aware. The compact-GVRP application component further includes an encoder/decoder unit that collapses VLAN registration information according to an encoding algorithm. The collapsed VLAN registration information is then loaded into a single compact-GVRP PDU message for transmission from the respective port. The encoder/decoder unit also recovers encoded VLAN registration from received compact-GVRP PDU messages for operating the state machines.

32 Claims, 8 Drawing Sheets

OTHER PUBLICATIONS

"Written Opinion of the International Searching Authority" of International application No. PCT/US2004/031199 with an International filing date of Sep. 23, 2004.

The Institute of Electrical and Electronic Engineers, "IEEE Standards for Local and Metropolitan Area Networks: Virtual Bridged Local Area Networks", IEEE Std. 802.IQ-1998, Approved Dec. 8, 1998, XP002240505.

Finn, Norman, "Compact GVRP" Retrieved from the internet at <http://www.ieee802.org/1/files/public/docs2004/Compact-GVRP-5.pdf>, XP 002318539.

The Institute of Electricalo and Electronic Engineers, "Part 3: Media Access Control (MAC) Bridges", ANSI/IEEE Std 802.ID, 1998, XP 002241251.

* cited by examiner

| ATTRIBUTE EVENT CODES ||
| CODE VALUE, E | ATTRIBUTE EVENT |
| --- | --- |
| 0 | In |
| 1 | JoinEmpty |
| 2 | JoinIn |
| 3 | LeaveEmpty |
| 4 | Empty |

FIG. 6

| EVENT | APPLICANT: | VA | AA | QA | VO | AO | QO | VA | AA | QA | VO | AO | QO |
|---|---|---|---|---|---|---|---|---|---|---|---|---|---|
|  | REGISTRAR: | \multicolumn{6}{c}{IN 826} | \multicolumn{6}{c}{MT 828} |
| transmitPDU! 830 |  | sJI / AA / IN | sJ / AA / IN | sJ / QA / IN | sJ / AO / IN | sI / AO / IN | xI / QO / IN | sJE / AA / MT | sJE / AA / MT | sJE / QA / MT | sE / AO / MT | sE / AO / MT | xE / QO / MT |
| rJoinIn 832 |  | QA / IN | QA / IN | QA / IN | VO / IN | QO / IN | QO / IN | QA / MT | QA / MT | QA / MT | VO / MT | QO / MT | QO / MT |
| rJoinEmpty 834 |  | VA / IN | VA / IN | VA / IN | VO / IN | VO / IN | VO / IN | AA / IN | AA / IN | AA / IN | VO / IN | VO / IN | VO / IN |
| rEmpty 836 |  | VA / MT | VA / MT | VA / MT | AO / MT | AO / MT | AO / MT | AA / IN | AA / IN | AA / IN | AO / IN | AO / IN | AO / IN |
| LeaveIn 838 |  | AA / MT | VA / MT | VA / MT | VA / MT | VA / MT | VA / MT | VA / MT | VA / MT | VA / MT | QO / MT | QO / MT | QO / MT |
| rLeaveEmpty 840 |  | VA / MT | VA / MT | VA / MT | VA / MT | VA / MT | VA / MT | VA / MT | VA / MT | VA / MT | VO / MT | VO / MT | VO / MT |
| rIn 842 |  | AA / MT | AA / MT | AA / MT | VA / MT | AA / MT | VA / MT | QA / MT | QA / MT | QA / MT | QO / MT | QO / MT | QO / MT |
| LeaveAll 844 |  | VA / MT | VA / MT | VA / MT | VA / MT | VA / MT | VA / MT | VA / MT | VA / MT | VA / MT | QO / MT | QO / MT | QO / MT |
| ReqJoin 846 |  | -\* | -\* | -\* | -\* | -\* | -\* | VA / MT | VA / MT | -\* | VA / MT | VA / MT | VA / MT |
| ReqLeave 848 |  | VO / IN | VO / IN | VO / IN | VO / IN | VO / IN | -\* | VO / MT | VO / MT | VO / MT | VO / MT | VA / MT | -\* |

FIG. 8

SYSTEM AND METHOD FOR REGISTERING AND UN-REGISTERING MEMBERSHIP IN VIRTUAL LOCAL AREA NETWORKS

BACKGROUND OF THE INVENTION

1. Field of the Invention

The present invention relates generally to computer networks, and more specifically, to a method and apparatus for disseminating virtual local area network membership information across computer networks.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, FDDI or token ring, that defines the functions performed by data link and physical layers of a communications architecture (i.e., a protocol stack).

One or more intermediate network devices are often used to couple LANs together and allow the corresponding entities to exchange information. For example, a bridge may be used to provide a "switching" function between two or more LANs or end stations. Typically, the bridge is a computer and includes a plurality of ports that are coupled via LANs either to other bridges, or to end stations such as routers or host computers. Ports used to couple bridges to each other are generally referred to as a trunk ports, whereas ports used to couple bridges to end stations are generally referred to as access ports. The bridging function includes receiving data from a sending entity at a source port and transferring that data to at least one destination port for forwarding to one or more receiving entities.

Metropolitan Area Networks (MANs)

Multiple LANs and/or end stations may be interconnected by point-to-point links, microwave transceivers, satellite hook-ups, etc. to form a metropolitan area network (MAN) that typically spans several city blocks, an entire city and/or an entire metropolitan area, such as the San Francisco Bay Area. The MAN typically interconnects multiple LANs and/or end stations located at individual campuses and/or buildings that are physically remote from each other, but that are still within the metropolitan area. Conventional MANs typically rely on network equipment employing Asynchronous Transfer Mode (ATM) running over the existing Public Switched Telephone Network's (PSTN's) Synchronous Optical Network (SONET). As most LANs utilize the Ethernet standard, network messages or packets created at one LAN must be converted from Ethernet format into ATM cells for transmission over the SONET links. The ATM cells must then be converted back into Ethernet format for delivery to the destination LAN or end station.

Virtual Local Area Networks

A computer network may also be segmented into a series of logical networks. For example, U.S. Pat. No. 5,394,402, issued Feb. 28, 1995 to Ross (the "'402 patent"), discloses an arrangement for associating any port of a switch with any particular network segment. Specifically, according to the '402 patent, any number of physical ports of a particular switch may be associated with any number of groups within the switch by using a virtual local area network (VLAN) arrangement that virtually associates the port with a particular VLAN designation. More specifically, the switch or hub associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. Those entities having the same VLAN designation function as if they are all part of the same LAN. VLAN-configured bridges are specifically configured to prevent message exchanges between parts of the network having different VLAN designations in order to preserve the boundaries of each VLAN. Nonetheless, intermediate network devices operating above Layer 2 (L2), such as routers, can relay messages between different VLAN segments.

In addition to the '402 patent, the Institute of Electrical and Electronics Engineers (IEEE) promulgated the IEEE Std. 802.1Q-1998 specification standard for Virtual Bridged Local Area Networks. To preserve VLAN associations of messages transported across trunks in VLAN-aware networks, both Ross and the IEEE Std. 802.1Q-1998 specification standard disclose appending a VLAN identifier (VID) field to the corresponding frames. In addition, U.S. Pat. No. 5,742,604 to Edsall et al. (the "'604 patent"), which is commonly owned with the present application, discloses an Interswitch Link (ISL) encapsulation mechanism for efficiently transporting packets or frames, including VLAN-modified frames, between switches while maintaining the VLAN association of the frames. In particular, an ISL link, which may utilize the Fast Ethernet standard, connects ISL interface circuitry disposed at each switch. The transmitting ISL circuitry encapsulates the frame being transported within an ISL header and ISL error detection information, while the ISL receiving circuitry strips off this information and recovers the original frame.

Typically, the ports of a switch are designated as either access ports or trunk ports. An access port corresponds to a switch port that connects to a single end station or to a LAN to which no other switch is attached. A trunk port, on the other hand, connects two switches, e.g., through a dedicated link, such as a point-to-point link or through a shared medium. By default, a switch transmits all broadcast, multicast and flooded unicast frames on all of its trunk ports. However, such transmissions can waste bandwidth if there are no access ports associated with the VID of the broadcast, multicast or flooded unicast frame through a given trunk port. To prevent such unnecessary transmissions, the IEEE developed a protocol for registering membership in VLANs.

GARP VLAN Registration Protocol

Specifically, the IEEE developed the Generic Attribute Registration Protocol (GARP). See IEEE Std. 802.1D, 1998 edition. As its name implies, GARP provides a framework that allows participants to make and withdraw declarations for generic attributes. In response to a GARP declaration, other network participants register the parameter value(s) of the specified attribute at the port on which the declaration was received. GARP participants also propagate declarations so that other participants in the network can make appropriate registrations. Participants can also withdraw their previous declarations. In response to a withdrawal, the other participants de-register the particular parameter value(s).

A GARP participant consists of a GARP application component and a GARP Information Declaration (GID) component. The GID component consists of a set of state machines that define the current registration and declaration state for all attribute values. A GARP participant is typically established for each port per GARP application. Thus, for intermediate devices, which often have multiple ports, multiple GARP participants are established. To make or withdraw declarations, GARP participants generate and send special messages called GARP Protocol Data Unit (GARP PDU) messages. FIG. 1 is a block diagram of a conventional GARP PDU message 100. The GARP PDU message 100 typically includes a Media Access Control (MAC) header 102 that includes destination and source address fields, among other information, a protocol identifier (ID) field 104, a plurality of message fields, such as message fields 106, 108 and 110, and an end mark field 112. Each message field, moreover, includes an attribute type field 114 and an attribute list field 116. The attribute list field 116, in turn, includes one or more attribute fields, such as attribute fields 118, 120 and 122, and an end mark field 124. Each attribute field, such as field 118, includes a 1-byte attribute length field 126, a 1-byte attribute event field 128 and a variable length attribute value field 130.

In order to exchange information among the GARP participants disposed within a given intermediate device, a separate component, called the GARP Information Propagation (GIP) component, is used. The GIP component operates over a GIP context that is established at the intermediate device and defines the ports that are to be included in the given context. That is, although registration can occur at any port, the propagation of that registration only follows the associated GIP context. For example, a GIP context may consist of the ports that belong to the active topology (i.e., all ports in the forwarding spanning tree state). Because blocked ports are not part of the GIP context, a declaration received on a blocked port is not propagated to any other ports, although it is still registered at the blocked port. In contrast, a declaration received at a port that is in the forwarding spanning tree state is both registered at that port and propagated throughout the GIP context (i.e., to all of the other ports that are in the forwarding state).

In order to limit the transmission of broadcasts, multicasts and unicast floods associated with a given VID, the IEEE specified an application based on GARP to disseminate VLAN membership information across computer networks. This application, which has been standardized by the IEEE, is known as the GARP VLAN Registration Protocol (GVRP). See IEEE Std. 802.1Q-1998 specification standard. According to GVRP, a bridge starts with the list of VLANs assigned to its access ports. All broadcasts, multicasts and flooded unicasts associated with these listed VLANs need to be received at the bridge. GVRP provides a mechanism for bridges to transmit their lists to the other bridges in order to register these VLANs at the other bridges' trunk ports. Specifically, the bridge generates a GARP PDU message 100 that has an attribute structure, i.e., fields 126, 128 and 130 for each VLAN in the bridge's list of VLANs. The bridge transmits the GARP PDU message 100 from each of its trunk ports. The GARP-PDU messages 100 are received on the trunk ports of neighboring bridges. Assuming the GARP PDU message 100 is received on a port in the forwarding spanning tree port state, the receiving bridge registers the list of the VLANs contained in the GARP PDU at all of its other ports that are also in the forwarding state, and not just on the port at which the GARP PDU message 100 was received. The neighboring bridge then generates and transmits GARP PDU messages 100 of its own that list both the VLANs associated with the neighboring bridge's access ports, and the VLANs that were registered as a result of having received a GARP PDU message from the original bridge. If a GARP PDU message is received at a port that is in the blocking spanning tree port state, the VLANs contained in the GARP PDU message are registered at that blocked port, but they are not registered at any other bridge port nor are they used in GARP PDU messages sent by the bridge.

As shown in FIG. 1, four bytes are needed to express the state of each VLAN being mentioned in a given GVRP PDU message 100. Because most enterprise networks typically employ only on the order of one to two hundred VLANs or less, this 4-byte per VLAN requirement does not impose significant burdens on the network. In fact, many enterprise networks limit the spread of multicast MAC addresses, and accept the waste of bandwidth when VLAN associated broadcast, multicast or flooded uni-cast frames are sent into areas of the network in which no entities associated with the corresponding VLAN are located.

Recently, however, network designers have proposed creating L2 MANs that are capable of interconnecting hundreds of different customer networks. Such a MAN might employ a thousand VLANs or more in order to distinguish the traffic of different customers. With this many VLANs in the computer network, the 4-byte attribute structure of GVRP starts to create significant problems. First, it is not possible to insert an attribute structure for all VLANs within a single GVRP PDU message, which, for Ethernet links, is limited to 1500 bytes. Instead, each such GVRP PDU message can only carry attribute information for 373 VLANs. In this case, a bridge may need to transmit eleven or more GVRP PDU messages in order to convey registration information for all VLANs. The need to transmit such large numbers of GVRP PDU messages each time the network's topology changes causes a significant amount of the network's available bandwidth to be consumed by control packets. In addition, each of these GVRP PDU message must be parsed and then processed by the receiving bridge, thereby imposing burdens on the bridge's processor.

Accordingly, a need exists for a mechanism that can efficiently convey large amounts of VLAN membership information across computer networks.

SUMMARY OF THE INVENTION

Briefly, the present invention provides a system and method that efficiently conveys Virtual Local Area Network (VLAN) membership information across a bridged network. In particular, an intermediate network device, such as a bridge, includes a plurality of ports for interconnecting entities of a computer network. For each port, a Generic Attribute Registration Protocol (GARP) participant is established that has a compact GARP VLAN Registration Protocol (GVRP) application component and a GARP Information Declaration (GID) component. The GID component operates a plurality of state machines to track the registration state of all of the VLANs of which the port has been made aware. The compact-GVRP application component further includes an encoder/decoder unit and a GVRP PDU message generator. The GVRP PDU message generator is specially configured to generate a new compact-GVRP PDU message that can carry VLAN registration information for all VLANs in the computer network.

The compact-GVRP application component first determines if there are other entities running GVRP coupled to the respective port and, if so, whether those other entities are running standard GVRP or compact-GVRP. If all of the other entities are running compact-GVRP, then the compact-GVRP application component utilizes its encoder/decoder unit to collapse VLAN registration information so that it will fit within a single compact-GVRP PDU message. Specifically, the encoder/decoder unit is configured to apply an encoding algorithm to all VLAN registration information at the port. Once the VLAN registration information has been encoded, it is loaded into the compact-GVRP PDU message. The encoder/decoder unit is further configured to recover VLAN registration information that has been encoded in received compact-GVRP PDU messages. The recovered VLAN registration information is then used to update the registration state associated with each VLAN.

In a further embodiment, the compact-GVRP application component determines whether there is just a single entity running compact-GVRP coupled to the port. If so, the compact-GVRP application component is configured to unregister VLAN memberships immediately. That is, VLAN memberships can be unregistered without having to wait for the expiration of any timer.

BRIEF DESCRIPTION OF THE DRAWINGS

The invention description below refers to the accompanying drawings, of which:

FIG. 5 is a highly schematic illustration of a message for use in the compact-GVRP PDU message of FIG. 4;

FIG. 6 is a table mapping code values to GARP state information;

FIGS. 7 and 8 are state diagrams in accordance with the present invention.

DETAILED DESCRIPTION OF AN ILLUSTRATIVE EMBODIMENT

Figure 2:
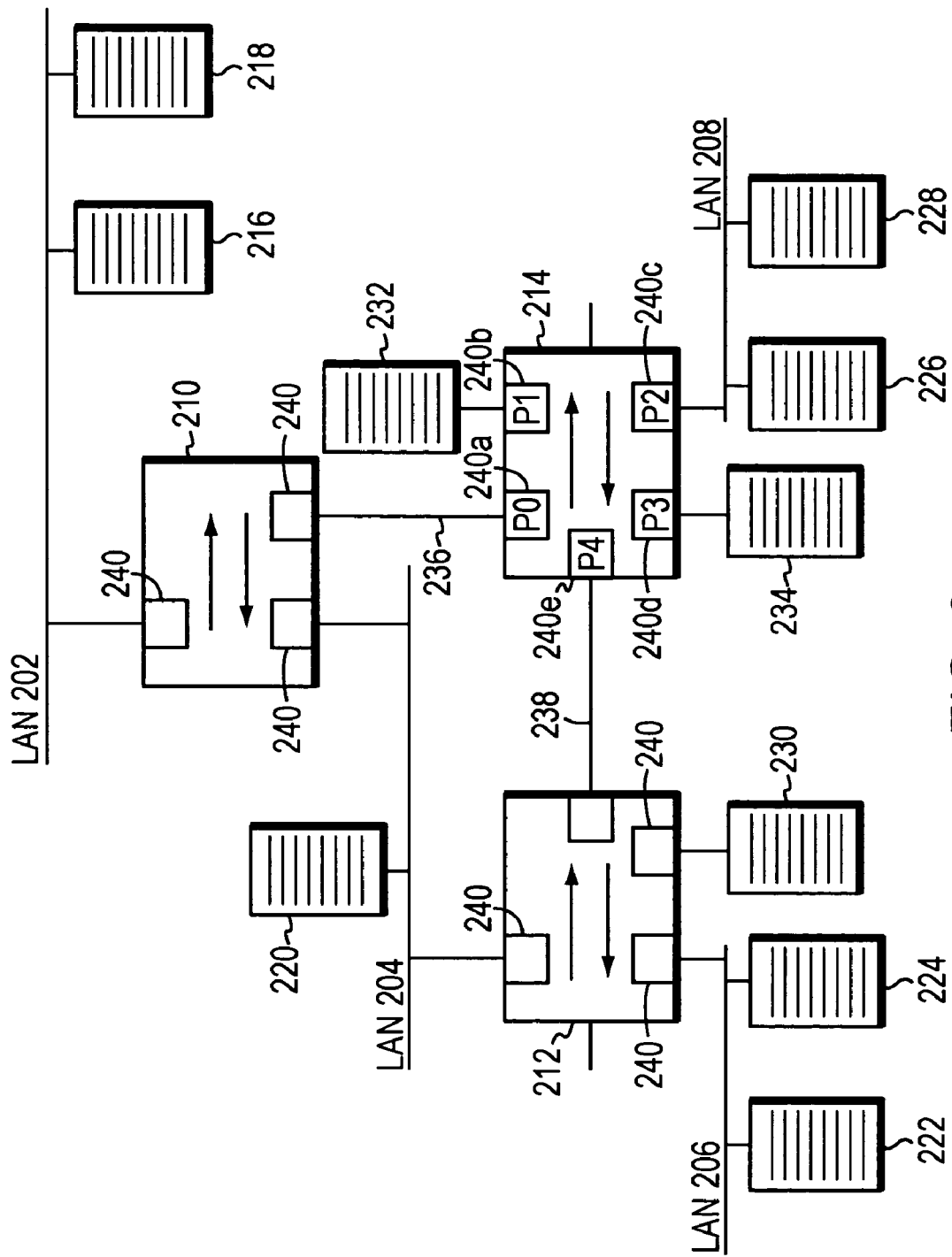
FIG. 2 is a highly schematic illustration of a computer network.

FIG. 2 is a highly schematic illustration of a bridged network 200 that includes a plurality of, e.g., four, local area networks (LANs) 202-208 interconnected by three intermediate network devices 210, 212 and 214. Devices 210-214 are preferably bridges. Attached to the LANs 202-208 are a plurality of end stations 216-228, which may be personal computers, work stations, servers, etc. Network 200 further includes several end stations that are directly coupled to the bridges 210-214. In particular, end station 230 is directly connected to bridge 212, and end stations 232 and 234 are directly connected to bridge 214. In addition, bridges 210 and 214, and bridges 212 and 214 are interconnected by point-to-point links 236 and 238, respectively.

Each bridge 210-214 includes a plurality of ports 240 for receiving and forwarding network messages across the bridged network 100. The ports 240 of each bridge, moreover, may be identified, e.g., by port numbers, such as Port 0 (P0), Port 1 (P1), Port 2 (P2), etc., so that the network entities that can be reached by a respective bridge can be associated with the number of the port used to reach those entities. Bridge ports 240 connected to end stations, or to LANs to which no other bridge is connected, are referred to as access ports. Bridge ports that connect to another bridge, such as through a point-to-point link or a shared medium, are referred to as trunk ports.

The LANs 202-208 and end stations of network 200 are preferably segmented into a plurality of Virtual Local Area Networks (VLANs) as configured by a network administrator. In addition, a network message, such as a frame, being sent from a trunk port is tagged with the VLAN designation associated with the frame. Frames may be tagged in accordance with the IEEE Std. 802.1Q-1998 specification standard, which is hereby incorporated by reference in its entirety, and/or in accordance with the Inter-Switch Link (ISL) protocol from Cisco Systems, Inc. of San Jose, Calif., as described in commonly owned U.S. Pat. No. 5,742,604, which is also hereby incorporated by reference in its entirety.

Each bridge preferably includes transmitting and receiving circuitry and components, including one or more network interface cards (NICs) for implementing the ports 240, one or more central processing units (CPUs) and associated memory devices for performing calculations, and one or more bus structures. Associated with each bridge port 240, moreover, may be one or more frame transmission and reception objects (not shown), such as priority queues, so that network messages received at a given port may be captured and message to be transmitted may be delivered to a given port. Each bridge also includes at least one filtering database. The filtering database is configured to store the destination address and corresponding port number (e.g., port numbers P1-P4) used to reach specific end stations and other network devices. The filtering database is also configured to store the VLAN designation(s) associated with each port 240, as described below. A bridge utilizes its filtering database to make forwarding decisions regarding network messages received on its ports 240. A bridge may have a plurality of filtering databases each associated with a different VLAN designation. Alternatively, a bridge may include two or more filtering databases that are shared among the various VLAN designations.

Suitable bridge platforms for the present invention include the commercially available Catalyst 4000 and 6000 series of switches from Cisco Systems, Inc. of San Jose, Calif.

The computer network 200 of FIG. 2 is meant for illustration purposes only and is not meant to limit the invention. Indeed, the present invention may be advantageously used in a large Metropolitan Area Network (MAN) used to interconnect thousands of different customer networks.

GARP Participant

Figure 3:
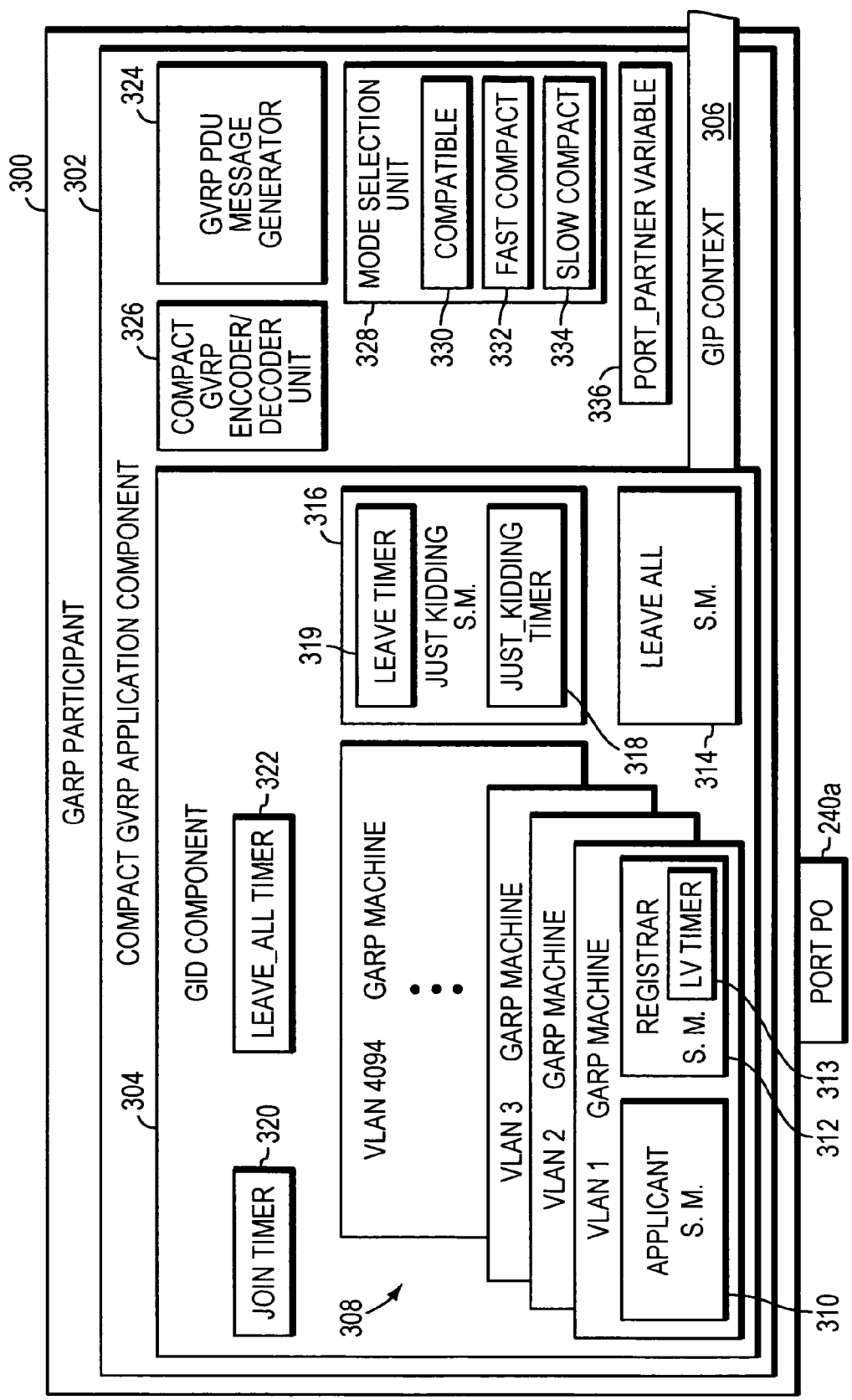
FIG. 3 is a functional diagram of a GARP participant in accordance with the present invention.

FIG. 3 is a highly schematic illustration of a Generic Attribute Registration Protocol (GARP) participant 300 in accordance with a preferred embodiment of the present invention. GARP participant 300 may be disposed at bridge 214, and is preferably associated with one of the ports, e.g. port 240*a* (P0), thereof. GARP participant 300 includes a compact GARP VLAN Registration Protocol (GVRP) application component 302 that, in turn, includes a GARP Information Declaration (GID) component 304. The GID component 304 may, depending on the spanning tree state of the respective port, participate in one or more GARP Information Propagation (GIP) contexts in order to exchange VLAN registration information among the ports 240 of the bridge 214. In the illustrative embodiment, a single GIP context 306 is established among the ports 240 of bridge 214. The single GIP context 306 is based upon the Common Spanning Tree (CST). That is, those ports 240 of bridge 214 that are in the forwarding spanning tree port state participate in the GIP context 306, thereby allowing them to exchange VLAN registration information. Those ports 240 of bridge 214 that are in the blocking spanning tree state do not participate in the GIP context 306. Accordingly, VLAN registration information recorded at a blocked port is not shared with any of the other ports of bridge 214.

The GARP participant 300, including the compact-GVRP application component 302, basically operates as provided in the IEEE Std. 802.1D, 1998 edition, which is hereby incorporated by reference in its entirety, and the IEEE Std. 802.1Q-1998 specification standard except as described herein.

The GID component 304 establishes and maintains a plurality of state machines. Specifically, GID component 304 establishes a GARP machine 308 for each VLAN for which registration information is being kept. In the illustrated embodiment, the bridged network 100 supports up to 4096 different VLANs as provided in the IEEE Std. 802.1Q-1998 specification standard, although only 4094 VLANs are available for assignment, as VIDs "0" and "4095" are reserved. Accordingly, GID component 304 may create up to 4094 GARP machines 308. Each GARP machine 308, in turn, has an applicant state machine 310 and a registrar state machine 312, and each registrar state machine 312 preferably has its own leave timer 313. The GID component 304 further establishes one Leave All state machine 314 and one just_kidding state machine 316, which has its own just_kidding timer 318 and its own leave timer 319. The GID component 304 further includes a Join timer 320 and a Leave_all timer 322.

In addition to having a GID component 304, the compact-GVRP Application component 302 also includes a GVRP Protocol Data Unit (PDU) message generator 324. As described herein, the GVRP PDU message generator 324 is configured to generate three different types of GVRP PDU messages. The first type of GVRP PDU message is a modified version of the standard GVRP PDU set forth in the IEEE Std. 802.1Q-1998 specification standard. The second type of GVRP-PDU message is an entirely new format, which is referred to herein as a compact-GVRP PDU message. The third type has elements of both the standard GVRP PDU message format and the compact-GVRP PDU message format, and is referred to herein as a mixed-format GVRP PDU message. The compact-GVRP application component 302 further includes a compact-GVRP encoder/decoder unit 326, a mode selection unit 328 that can switch operation of the compact-GVRP application component 302 between a compatible mode 330, a fast compact mode 332 and a slow compact mode 334. Component 302 also has a port_partner variable 336, which is used to determine whether one, or more than one, compact-GVRP compliant devices are coupled to port 240a When operating in either the fast or slow compact modes 332 and 334, the application component 302 generates and issues compact-GVRP PDU messages. When operating in compatible mode, it generates and issues modified versions of the standard GVRP PDU messages.

Figure 4:
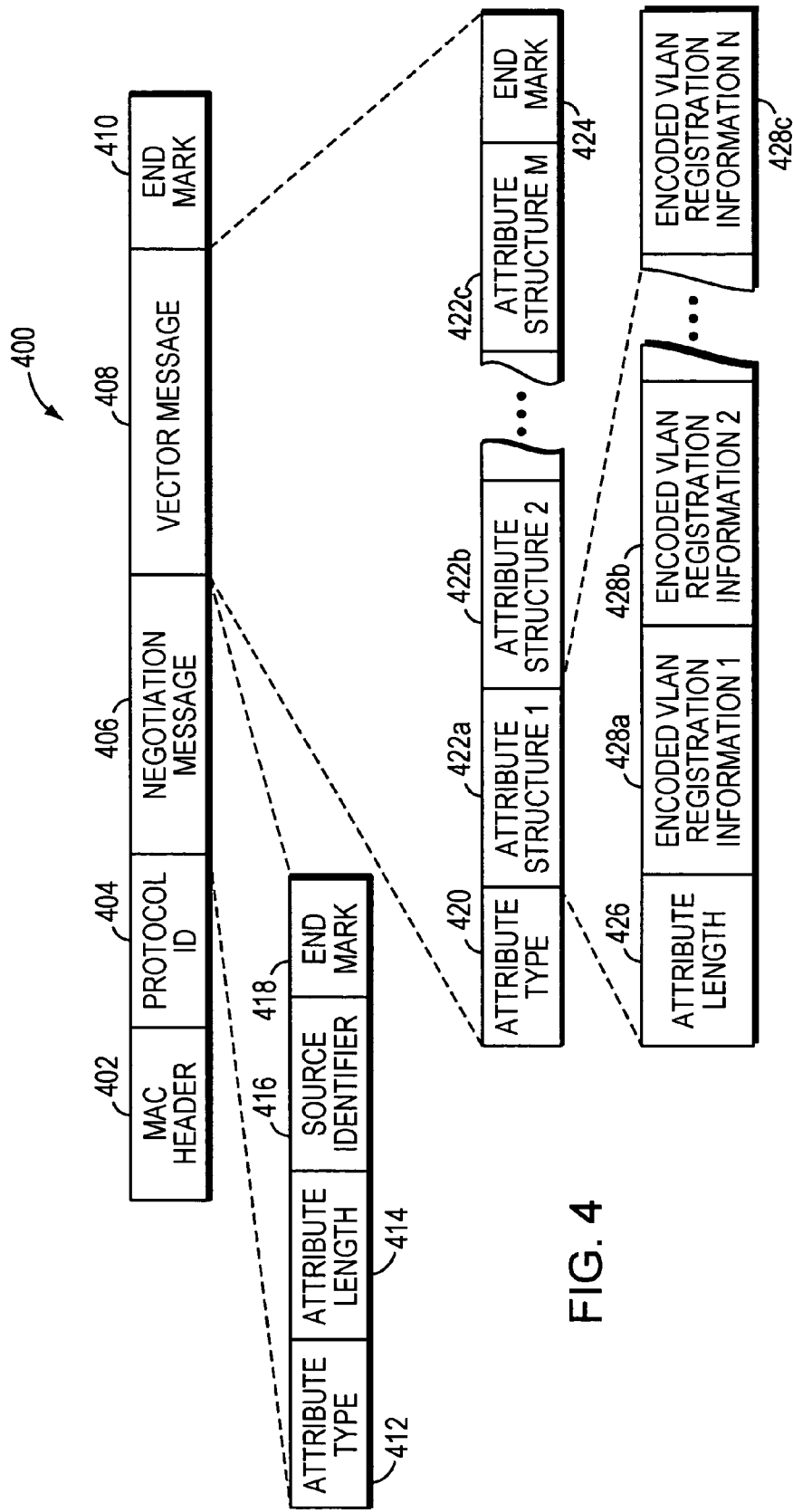
FIG. 4 is a highly schematic illustration of a compact GARP Virtual Local Area Network (VLAN) Registration Protocol (GVRP) Protocol Data Unit (PDU) message in accordance with the present invention.

FIG. 4 is a highly schematic illustration of the preferred format of a compact-GVRP PDU message 400. The compact-GVRP PDU message 400 includes a MAC header 402 that includes destination and source address fields, among other information, a protocol ID field 404, a negotiation message 406, a vector message 408 and an end mark 410. The negotiation message 406, in turn, has a plurality of fields including a 1-byte attribute type field 412, a 1-byte attribute length field 414, an 8-byte source identifier field 416, and a 1-byte end of mark field 418. The attribute type field 412 is preferably loaded with a predetermined value that is as yet unassigned by the conventional GVRP protocol, such as, "2", and that all entities running the compact-GVRP mechanism of the present invention are configured to recognize as identifying a compact GRVP compatibility message. The attribute length field 414 is loaded with a value specifying the length of the source identifier field 416 and the end mark field 418, i.e., 11-bytes. The source identifier field 416 is loaded with a globally unique value for the entity that sourced the compact-GVRP PDU message 400. In the illustrative embodiment, the source identifier has two parts: a 6-byte device identifier, which preferably corresponds to a unicast MAC address of the entity sourcing the compact-GVRP PDU message 400, and a 2-byte device sub-identifier, which is used to indicate the particular port from which the compact-GVRP PDU message 400 was sourced. The device sub-identifier may be set to the port number assigned to the particular port from which the compact-GVRP PDU message 400 will be sent.

The vector message 408 similarly has a plurality of fields including a 1-byte attribute type field 420, one or more variable length attribute structure fields, such as attribute structure 1 field 422a, attribute structure 2 field 422b and so on to attribute structure M field 422c, and a 1-byte end of mark field 424. Again, the attribute type field 420 is preferably loaded with an as yet unassigned value, such as "4", that all entities running the compact-GVRP protocol are configured to recognize as identifying a vector message. Each attribute structure field 422 comprises a plurality of fields. For example, attribute structure 1 field 422a has an attribute length field 424 and one or more encoded VLAN registration information fields 428, such as encoded VLAN registration information 1 field 428a, encoded VLAN registration information 2 field 428b and so on up to encoded VLAN registration information N field 428c. Each encoded VLAN registration field 428 carries an encoded value corresponding to the VLAN registration events of six VLANs. The first encoded VLAN registration information field 428a carries an encoded value for VLAN IDs 1 through 6. The second encoded VLAN registration information field 428b carries an encoded value for VLAN IDs 7 through 12. The third encoded VLAN registration information field carries an encoded value for VLAN IDs 13 through 18, and so on. In other words, each encoded VLAN registration information field 428 carries an encoded value for six sequential VLAN IDs. In the illustrated embodiment, each encoded value, moreover, is a 2-byte integer that encodes one of five possible VLAN registration states for six different VLANs. Accordingly, VLAN registration information for all 4094 VLANs can be encoded within 683 2-byte encoded VLAN registration information fields 428, thereby satisfying the 1500-byte limit of Ethernet links.

As each encoded VLAN registration information field 428 carries the attribute events for six VLAN IDs, the last encoded VLAN registration information field 428 may include "attributes" for illegal or non-existent VLAN IDs, such as VLAN IDs 4095, 4096, etc., in order to meet the six VLAN ID requirement.

In addition, every compact-GVRP application component 302 is configured to insert a negotiation message 406 in all GVRP PDU messages that it sends. The negotiation message 406, moreover, must be the first message in the compact-GVRP PDU message 400.

As mentioned above, the compact-GVRP application component 302 for each port operates in either the compatible mode 330 or one of the two compact modes 332 and 334. When operating in the compatible mode, the application component 302 generates and issues a modified version of the standard GVRP PDU message format specified in the 802.1D/802.1Q specification standards. In particular, the standard GVRP PDU message is modified to include a negotiation message having the same format as negotiation message 406 described above. The inclusion of a negotiation message 406 in an otherwise standard format GVRP PDU message signals that the device sending the modified GVRP PDU message is compliant with the compact-GVRP mechanism disclosed herein. In this way, two or more compact-GVRP compliant bridges that are coupled together, e.g., via a point-to-point link or a shared medium, can discover the existence of each other. Nonetheless, because the negotiation message 406 uses an attribute type value, e.g., "2", that is not otherwise assigned by the conventional GVRP protocol, standard GVRP implementations simply ignore the presence of the negotiation message.

In operation, when a port, such as port 240a, is initialized, its compact-GVRP application component 302 starts out in the compatible mode 330. That is, the mode selection unit 328 causes component 302 to begin in compatible mode 330. The compact-GVRP application component 302 also sets each bit of its port_partner variable 336 to "1". In addition, the Leave All state machine 314 starts out in the passive state, and the Leave_all timer 322 is started. When the Leave_all timer 322 expires, the Leave All state machine 314 transitions to the active state. In response to entering the active state for the first time since the port 240a was initialized, the compact-GVRP application component 302 preferably generates and sends a GVRP PDU message that is specially configured to cause the network entities that receive it, i.e., the network entities that are coupled to the respective port 240a, to respond with one or more GVRP PDU messages of their own. By examining the format and contents of these received GVRP PDU messages, component 302 can determine whether any of these other network entities are also compact-GVRP compliant. The specially configured GVRP PDU message is preferably a conventional Leave All GVRP PDU as described in the 802.1D/802.1Q specification standards, but with an additional, novel message, which is preferably called a just_kidding message.

Figure 1:
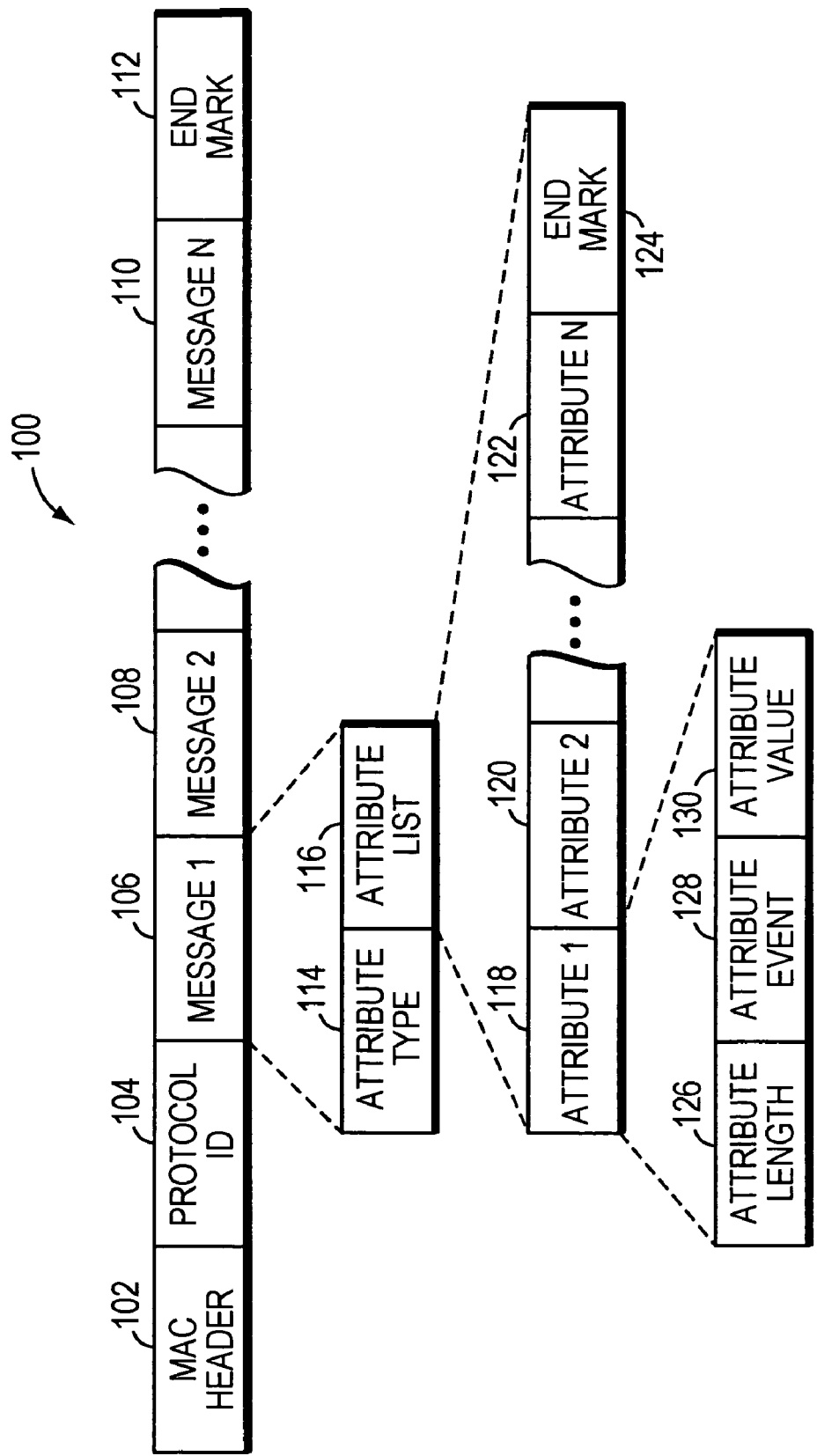
FIG. 1, previously discussed, is a block diagram of a conventional Generic Attribute Registration Protocol (GARP) protocol data unit (PDU)
Figures 5, 7:
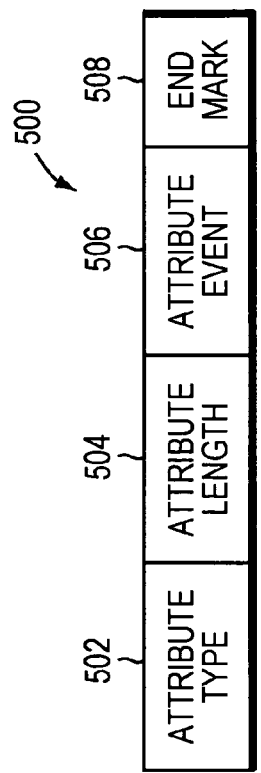

FIG. 5 is a highly schematic illustration of a preferred format of a just_kidding message 500 specially configured for inclusion in the otherwise conventional Leave All GVRP PDU message. Just_kidding message 500 has a 1-byte attribute type field 502, a 1-byte attribute length field 504, a 1-byte attribute event field 506 and a 1-byte end mark field 508. As shown, unlike the conventional GVRP PDU attribute structures, which always include an attribute value field 130 (FIG. 1), no such attribute value field is included in the just_kidding message 500. As described before, the attribute type field 502 is preferably loaded with an as yet unassigned attribute type value, such as "3", which GVRP application components that are compact-GVRP compliant are configured to recognize as indicating a just_kidding type of message. The just_kidding message 500 is placed ahead of the Leave_all message so that it will be observed before the Leave_all message.

Upon transmitting the Leave_all GVRP PDU message with the just_kidding message 500, component 302 also starts the just_kidding state machine's leave timer 319, and re-starts its just_kidding timer 318. In the preferred embodiment, the just_kidding timer is set to a high value relative to the leave_all timer 322, such as ten times the value of the leave_all timer 322.

When a GVRP application component, that is compact-GVRP compliant, receives a GVRP PDU message containing a just_kidding message 500, it ignores the subsequent Leave_all message included in the GVRP PDU message. That is, the GID component of the compact-GVRP application component that received the just_kidding message 500 does not transition its applicant state machines to the Very Anxious state. On the other hand, a GVRP application component that is not compact-GVRP compliant does not recognize the just_kidding message 500 due to the selection of the unassigned attribute type value. Accordingly, the non-compliant GVRP application component ignores the just_kidding message, and treats the Leave_all message as a valid Leave_all message. In this case, the non-compliant GVRP application component causes its applicant state machines to transition to the Very Anxious state. This results in the non-compliant GVRP application component issuing one or more conventional GVRP PDU messages declaring the VLANs of interest.

If, in response to sending the Leave_all GVRP PDU message with a just_kidding message 500, application component 302 receives a conventional GVRP PDU message 100 that does not include a negotiation message 406, then component 302 "knows" that the entity that sent this conventional GVRP PDU message 100 is not compact-GVRP complaint. In this case, the mode selection unit 328 remains in the compatible mode 330 of operation. Similarly, if component 302 at any time receives a conventional GVRP PDU message, it reverts to the compatible mode 330 from either the slow or fast compact modes.

If the just_kidding state machine's leave timer 319 expires without component 302 having received any conventional GVRP PDU messages, then component 302 presumes that all of the GVRP application components coupled to this port 240a are compact-GVRP compliant. In response, the mode selection unit 328 switches operation to slow compact mode 334. Slow compact mode 334 refers to the condition where all GVRP application components coupled to the respective port are compact-GVRP compliant. Fast compact mode 332 refers to the condition where only one GVRP application component is coupled to the respective port and it is compact-GVRP compliant.

After transmitting the first just_kidding message 500, component 302 transmits just_kidding messages 500 only upon expiration of its just_kidding timer 318, which as described above is preferably on the order of ten times the value of the Leave_all timer 322. If the just_kidding timer 318 expires, component 302 restarts timer 318 and also starts its leave timer 319. Component 302 also generates and sends a Leave_all GVRP PDU message containing a just_kidding message 500 as described above. If the leave timer 319 expires without component 302 having received any conventional GVRP PDU messages, in other words component 302 has only received either compact-GVRP PDU messages or modified GVRP-PDU messages, i.e., GVRP PDU messages that have a negotiation message 406, then mode selection unit 328 switches operation to (or stays in) slow compact mode 334, provided that compact-GVRP PDU and/or modified GVRP PDU messages have been received from more than one other device, as determined by comparing the source identifier from field 416 of the received messages to the contents of the port_partner variable 336. If all of the compact-GVRP PDU and/or modified GVRP PDU messages that have been received have the same source identifier, then unit 328 switches operation to (or stays in) the fast compact mode 332 of operation.

In sum, in response to the first expiration of the just_kidding timer 318, the compact-GVRP application component 302 may switch to the slow compact mode 334. In response to the expiration of the just_kidding state machine's leave timer 319, component 302 may enter the fast compact mode 332 of operation.

It should be understood that the just_kidding timer 318 is reset each time it expires. In this way, a just_kidding message 500 is sent every so often. Furthermore, although the value of the just_kidding timer 318 is based on being ten times the leave all timer's value, the actual value used to reset the just_kidding timer 318 is preferably jittered in order to prevent it from becoming synchronized with other timer events or other devices.

Suppose a GVRP PDU message is received at port P0 240*a* of switch 214. Suppose further that the received GVRP PDU generally conforms to the standard GVRP PDU message format, but that it also includes a negotiation message 406, thereby indicating that the entity that sent this GVRP PDU message is compact-GVRP compliant. In response, the compact GVRP Application component 302 examines the contents of its port_partner variable 336. If the port_partner variable 336 is still set to all "1s", component 302 sets its port_partner variable 302 to the value contained in the source identifier field 416 of the received GVRP PDU message. Component 302 then processes the contents of the received GVRP PDU message as provided in the 802.1D/802.1Q specification standards. On the other hand, if the port_partner variable 336 is set to something other than all "1's", thereby indicating that component 302 has already received at least one modified GVRP PDU or compact-GVRP PDU message 400, component 302 preferably compares the value stored in its port_partner variable 336 to the value contained in the source identifier field 416 of the received modified GVRP PDU or compact-GVRP PDU message 400. If the two values are the same, then component 302 "knows" that this is at least the second modified GVRP PDU or compact-GVRP PDU message 400 that it has received from the same port of the same device. Nevertheless, in the preferred embodiment, no change in operation mode occurs. That is, component 302 continues to operate in the same mode, e.g., either compatible mode 330, slow compact mode 334 or fast compact mode 335. If the two values do not match, meaning that component 302 is coupled to at least two different compact-GVRP compliant devices (or to different ports of the same device), and component 302 is currently in fast compact mode 332, then mode selection unit 328 switches operation to slow compact mode 334. If component 302 is already operating in slow compact mode 334, then it simply stays in that mode of operation.

If it is operating in either the slow or fast compact modes 334 and 332, the compact-GVRP applicant component 302 associated with port 240*a* "knows" that the entity that sent the GVRP PDU is compliant with the compact GVRP mechanism. Accordingly, when component 302 is ready to send a GVRP PDU message of its own from port 240*a*, it preferably uses the form of a compact-GVRP PDU message 400.

More specifically, component 302 directs the GVRP PDU message generator 324 to create a compact-GVRP PDU message in the form of PDU message 400 (FIG. 4). Component 302 creates a source identifier value for loading into source identifier field 420 by concatenating a 48-bit MAC address assigned to bridge 214, such as the MAC address of port 240*a*, with the 16-bit port number, e.g., zero, assigned to port 240*a* from which the compact-GVRP PDU 400 will be transmitted. Next, component 302 directs its encoder/decoder unit 326 to encode the VLAN registration information that is to be conveyed into 2-byte integers for every six VLANs.

In the preferred embodiment, the encoder/decoder unit 326 uses the following encoding algorithm to encode the VLAN registration information:

$$((((E_X \times 5 + E_{X+1}) \times 5 + E_{X+3}) \times 5 + E_{X+4}) \times 5 + E_{X+5} \qquad (1)$$

where, $E_X$ corresponds to the VLAN registration event for the $x^{th}$ VLAN, $E_{X+1}$ corresponds to the VLAN registration event for the x+1 VLAN, and so on.

That is, by using equation (1), the encoder/decoder unit 326 generates an integer for the events associated with six sequential VLAN IDs. This integer is then loaded into the respective encoded VLAN registration information field, such as field 428*a*.

FIG. 6 is an illustration of an Attribute Event Code Table 600 showing a preferred mapping of code values, E, to the corresponding GVRP attribute events. Table 600 has a code value (E) column 602 and an attribute event column 604. Table 600 further includes a plurality of rows 606-614. In order to account for the situation where an event is being transmitted for a VLAN, which would not otherwise send a message under the 802.1D/802.1Q specification standards, an additional attribute event type is used. More specifically, the "In" event is defined as meaning "I have registered this attribute, i.e., VLAN ID, but I have not joined." Conventional GVRP PDU messages 100 do not include attribute structures for VLANs whose applicant state machines are in the state of having registered those VLANs but not having joined them. In contrast, the encoded VLAN registration information fields 428 of the present invention each contain attribute events for six sequential VLANs even if only some fewer number of VLANs, e.g., just one, need to transmit a change. The "In" message is used in compact-GVRP PDU messages 400 in connection with those VLANs which would not otherwise send a message.

As shown at row 606, if the specified attribute event for a given VLAN is the "In" event, then the encoder/decoder unit 326 sets the corresponding value for "E" in equation (1) to zero. As shown at row 608, if the event is JoinEmpty, the encoder/decoder unit 326 sets the corresponding value for "E" to "1". If the event is JoinIn, then the respective value for "E" is set to "2", as indicated at row 610. If the event is "LeaveEmpty, the respective value for "E" is set to "3", as indicated at row 612. If the event is Empty, the respective value for "E" is set to "4", as indicated at row 614.

It should be understood that the first encoded VLAN registration information field, i.e., field 428*a*, corresponds to VLAN IDs "0001", "0002", "0003", "0004", "0005" and "0006".

Those skilled in the art will recognize that other encoding algorithms besides the one illustrated in equation (1) may be used by unit 326.

Suppose that the event for VLAN ID 0001 is JoinEmpty, the event for VLAN ID 0002 is LeaveEmpty, the event for VLAN IDs 0003 and 0004 are both In. The event for VLAN ID 0005 is Empty, and the event for VLAN ID 0006 is JoinIn. Using equation (1), the encoder/decoder unit computes the corresponding integer value as follows $$((((1 \times 5 + 3) \times 5 + 0) \times 5 + 0) \times 5 + 4) \times 5 + 2 = 5022$$

Thus, the encoder/decoder unit 326 loads the integer value "5022" into the corresponding encoded VLAN registration information field 428*a*. The remaining encoded VLAN registration information fields 428 are similarly computed. For any illegal or nonexistent VLAN IDs that are included within an encoded VLAN registration information field 428, the "In" attribute event is used.

When a compact-GVRP application component 302 receives a compact-GVRP PDU message 400, it extracts the computed integers loaded into the encoded VLAN registration information fields 428 and passes them to the encoder/decoder unit 326. Unit 326 proceeds to decode the VLAN attributes for the six VLAN IDs corresponding to each of the recovered integer values. For example, suppose the encoder/decoder unit 326 receives the integer "5022" from a VLAN registration information field 428. First, given the position of the VLAN registration information field 428 within the vector message 408, the encoder/decoder unit 326 knows for which six VLANs the registration information has been encoded, and their order, since the vector message 408 contains encoded information for the VLANs in ascending order, e.g., sequentially from VLAN 1 to VLAN 4094. Suppose the six VLANs are 3001, 3002, 3003, 3004, 3005 and 3006.

To decode the VLAN registration information from the encoded integer, e.g., "5022", the encoder/decoder unit 326 divides the encoded integer by five and examines the remainder. Here, 5022/5=1004 with a remainder of "2". Using table 600, the encoder/decoder unit determines that the remainder, "2", corresponds to the JoinIn event. Thus, the JoinIn event is associated with the last VLAN corresponding to this VLAN registration information field, i.e., with VLAN 3006. Next, the encoder/decoder unit divides the quotient from the last operation, e.g., 1004, by five and again examines the remainder. Here, 1004/5=200 with a remainder of "4". Again, the encoder/decoder unit 326 uses table 600 and determines that "4" corresponds to the Empty event. This event is assigned to the second to last VLAN, i.e. to VLAN 3005. Again, the encoder/decoder unit divides the most recent quotient, i.e., 200, by five. This time, the result is "40", the remainder is "0", and "0" maps to the "In" event. Accordingly, the encoder/decoder unit 326 assigns the In event or message to the third to last VLAN, i.e., to VLAN 3004. Again, the encoder/decoder unit divides the prior quotient, i.e., "40", by five getting eight and a remainder of "0". As before, a remainder of "0" maps to the In event, and unit 326 assigns the In event to the fourth to last VLAN, i.e., to VLAN 3003. Continuing on, the encoder/decoder unit divides the prior quotient, "8", by five, getting a result of "1" and a remainder of "3". An encoded value of "3" maps to the LeaveEmpty event, which is assigned to the fifth to last (also the second) VLAN, i.e., to VLAN 3002. The final result "1", moreover, maps to the JoinEmpty event, which unit 326 assign to the sixth to last (also the first) VLAN, i.e., to VLAN 3001.

Using the recovered events, the respective applicant and registrar state machines 310 and 312 are updated. FIG. 7 is an applicant state diagram 700 showing the change in state of an applicant state machine 310 assigned to a given VLAN in response to various events as contained in received compact-GVRP PDU messages, standard GVRP messages or primitives received via the GIP context 306. State diagram 700 is organized at least logically as a table or array having a plurality of columns 702-722 each corresponding to a different applicant state, and a plurality of rows 724-740 each corresponding to the occurrence of a different event. The intersections of the rows and columns define cells storing information such as the change in state that occurs in response to the respective event.

One skilled in the art will recognize that the encoding/decoding algorithm described in connection with equation (1) is known as the "number base conversion" algorithm, which converts between numbers consisting of six base-5 digits and numbers consisting of 15 base-2 digits. In an alternative embodiment, the same basic algorithm could be used to encode 12 messages into a 30 or 32-bit value for loading into a compact-GVRP PDU message, or three messages into an 8-bit byte. It could even be used to encode all of the messages for all 4094 VLANs into a 9506-bit value carried in 1189 bytes. Those skilled in the art will recognize that other alternative arrangements for accomplishing the intent of the invention are also possible.

As shown, an applicant state machine 310 can be in any of the following different states: Very Anxious Active (VA), Anxious Active (AA), Quiet Active (QA), Leaving Active (LA), Very Anxious Passive (VP), Anxious Passive (AP), Quiet Passive (QP), Very Anxious Observer (VO), Anxious Observer (AO), Quiet Observer (QA), or Leaving Observer (LO). Some events, in addition to causing a change of state, also cause an action. For example, receipt of a transmitPDU! event while in the VA state causes a transition to the AA state and the sending of a JoinIn (sJI) attribute event for this VLAN if the registrar state machine is in the IN state in a compact-GVRP PDU message 400. Otherwise, a JoinEmpty (sJE) attribute event is sent. Receipt of a transmitPDU! while in the LA state causes a transition to the VO state and the sending of a Leave Empty attribute event (sLE) for this VLAN within a compact-GVRP PDU message 400. Because the receipt of an In attribute event does not cause a state change regardless of the current state, no entry or row is shown in FIG. 7 for the In attribute event.

An "In" event associated with a given VLAN ID does not cause a change of state of either the applicant or registrar state machines associated with that VLAN ID. VLANs not explicitly mentioned in a received compact-GVRP PDU message 400 are assigned the new In attribute event, which, as described, herein, does not result in a GVRP state change.

The applicant state diagram 700 is utilized by the applicant state machines 310 when operating in either compatible mode 330 or slow compact mode 334. In addition, while operating in either of these modes, the registrar state machines 312 use the state diagram described in the 802.1D/802.1Q specification standards.

It should be understood that in response to receiving a Leave event, such as a Leave, LeaveIn, LeaveEmpty or LeaveAll, while component 302 is operating in either the compatible or slow compact modes, the registrar state machine for 312 for the respective VLAN transitions from the IN state to the Leave (LV) state, and starts its leave timer 313. If the leave timer 313 expires without component 302 having received any declarations for the respective VLAN, the registrar state machine 312 transitions to the Empty (MT) state and the respective VLAN is de-registered.

If the compact-GVRP applicant component 302 is operating in the fast compact mode 332, it preferably utilizes a combined applicant/registrar state diagram. FIG. 8 is an illustration of a combined applicant/registrar state diagram 800. Combined table 800 has a first set of columns 802-824 corresponding to the various applicant states. Combined table 800 further includes a second set of columns 826-828 corresponding to two registrar states: In and Empty (MT). Combined table 800 further includes a plurality of rows 830-848 each corresponding to a particular event. Each row, such as row 830, has a first row element 830a that indicates the change to be made by the respective applicant state machine 310, and a second row element 830b that indicates the change to be made by the respective registrar state machine 312. Row 830 further includes a third row element 830c that specifies an action to be taken in addition to the state transitions specified in the first and second row elements 830a and 830b.

As indicated in table 800, if a compact-GVRP application component 302 is operating in the fast compact mode 332, and it receives a leave event, e.g., a Leave, LeaveIn, Leave-Empty or LeaveAll, the registrar state machine 312 for the respective VLAN transitions directly from the IN state to the MT state. That is, the registrar state machine 312 does not pass through the transitory leave (LV) state pending expiration of the leave timer 313. This is possible because component 302 "knows" that there are no other GVRP entities on the port other than the one that issued the leave event. Thus, there are no other entities that might issue a declaration for which component 302 should wait. Accordingly, the registrar state machine 312 moves directly from IN to MT and the registration of the respective VLAN is withdrawn immediately.

Mixed-Type GVRP PDU Message Format

Figure 9:
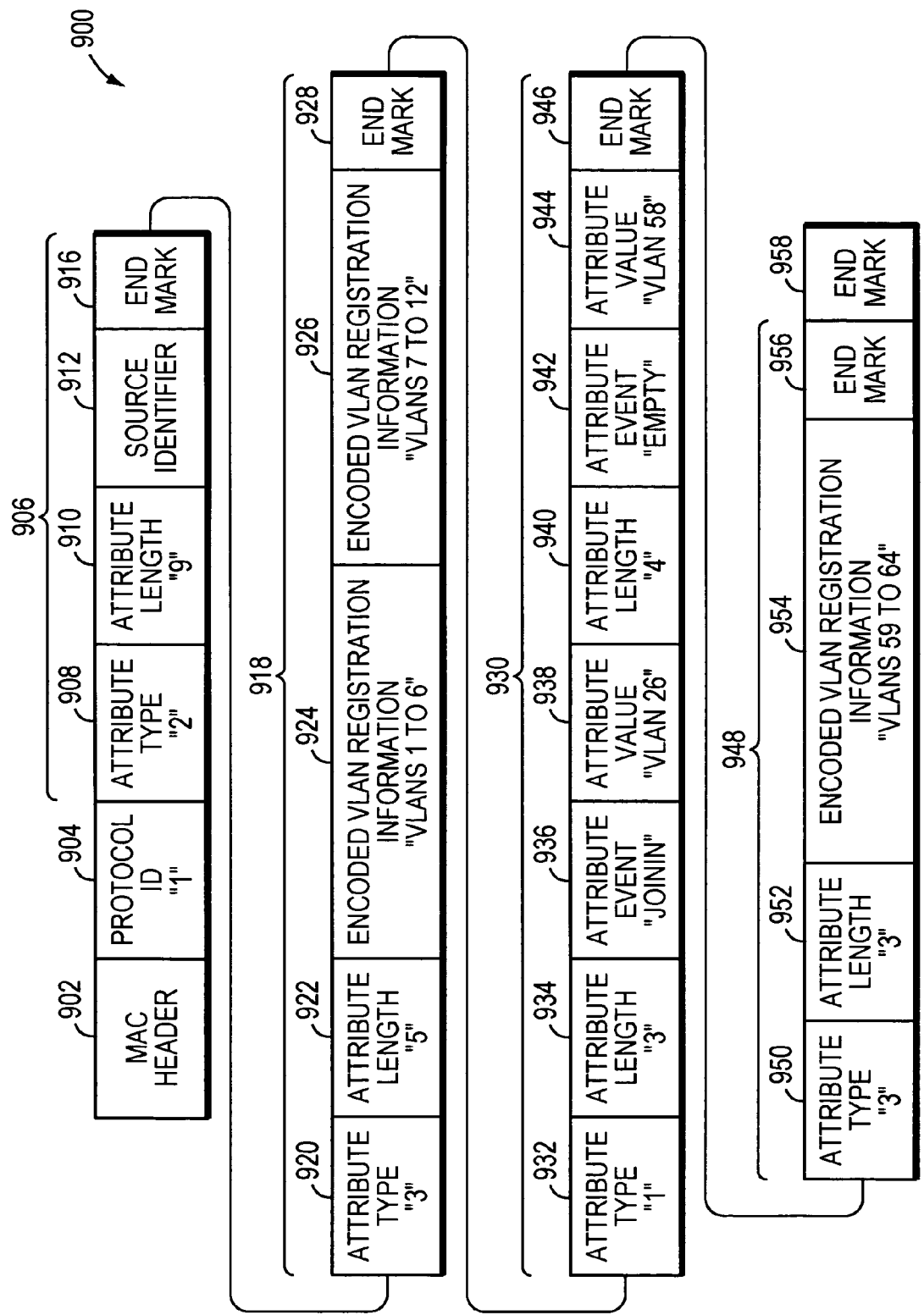
FIG. 9 is a highly schematic illustration of a mixed-format GVRP PDU message.

In a further embodiment of the present invention, the compact-GVRP application component 302 can generate mixed-format GVRP PDU messages. FIG. 9 is an illustration of an exemplary mixed-format GVRP PDU message 900. Mixed-format message 900 has a MAC header field 902 and a protocol ID field 904, which may be set to "1" to indicate that message 900 is a GVRP PDU message. Mixed-format message 900 then includes a negotiation message 906. As described above in connection with FIG. 4, the negotiation message 906 included in mixed-format message 900 has an attribute type field 908 preferably set to "2", an attribute length field 910 preferably set to "9", a source identifier field 912 preferably loaded with a globally unique value for the device and port from which the mixed-format 900 is being sent, and an end mark field 916. Following the negotiation message 906 is a first vector message 918. The first vector message 918 has an attribute type field 920 preferably set to "3", an attribute length field 922, which in this example is set to "5", a first encoded VLAN registration information field 924, which is loaded with an encoded integer that was computed based on the attribute events for VLANs "1" through "6". First vector message 906 further has a second encoded VLAN registration information field 926 that is loaded with another integer that was computed based upon the attribute events for VLANs "7" through "12", and an end mark field 928 signaling the end of the first vector message 918.

Following the first vector message 918 is a conventional attribute structure 930. Attribute structure 930 has an attribute type field 932 preferably set to "1", an attribute length field 934, which in this example is set to "4" a first attribute event field 936 which is set to the value assigned to the "JoinIn" attribute event, e.g., "2", and a first attribute value field 938, which is loaded with the VLAN ID, e.g., "26" whose event is specified in field 936. Attribute structure 930 further includes a second attribute length field 940 also set to "4", a second attribute event field 942, which is set to the value assigned to the "Empty" attribute event, e.g. "5", and a second attribute value field 944, which is loaded with the VLAN ID, e.g., "58", whose event is specified in field 942. The attribute structure 930 also has its own end mark field 946. Mixed-format message further includes a second vector message 948 following the attribute structure 930. The second vector message 948 has an attribute type field 950, which is set to "3", an attribute length field 952, which is set to "3", a single encoded VLAN registration information field 954, and an end mark field 956. The encoded VLAN registration information field 954 of second vector message 948 preferably carries an integer value computed in the manner described above for encoding the attribute events associated with VLANs "59" through "64".

It should be understood that the first VLAN of the second vector message 948 must correspond to the next VLAN in sequence after the last VLAN, i.e., VLAN "58", specified in the previous attribute structure. The first VLAN, i.e., VLAN "26", specified in the attribute structure 930, however, does not have to be the next VLAN in sequence following the prior vector message 906.

The mixed-format GVRP PDU message 900 is especially suited when transmitting attribute events for VLANs whose values are spread across a wide range, such as those illustrated in FIG. 9. By utilizing a mixed-format GVRP PDU message 900, a compact-GVRP application component 302 can avoid having to include numerous encoded VLAN registration information fields 428 for VLANs whose attribute event would be the "In" event.

It should be understood that the GID components may communicate over GIP contexts other than the single GIP context 306 corresponding to the Common Spanning Tree. For example, U.S. patent application Ser. No. 09/259,428 for a Virtual Local Area Network Membership Registration Protocol for Multiple Spanning Tree Network Environments, filed Mar. 1, 1999, which is hereby incorporated by reference in its entirety, discloses a multiple GIP context arrangement. The GID components of the present invention may utilize such multiple GIP contexts.

The foregoing description has been directed to specific embodiments of this invention. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. An intermediate network device having a plurality of ports for sending and receiving network messages to and from entities of a computer network at least some of which are segregated into a plurality of virtual local area network (VLANs) defined within the computer network, the intermediate network device comprising: a central processor unit (CPU); and
   a compact-Generic Application Registration Protocol (GARP) VLAN Registration Protocol (GVRP) application component associated with a selected port that is executable by the CPU, the compact-GVRP application component having:
   a GARP Information Declaration (GID) component configured to maintain VLAN registration state for the selected port in response to receiving attribute events for the VLANs,
   a compact-GVRP encoder/decoder unit; and
   a GVRP protocol data unit (PDU) message generator, wherein
   the compact-GVRP encoder/decoder unit is configured to compute encoded values, in accordance with a number base conversion encoding algorithm that encodes a plurality of attribute events that are each associated with a different VLAN of a given set of VLANs into each encoded value, and
   the GVRP PDU message generator is configured to load each encoded value into a separate field within a single attribute structure of a single GVRP PDU message, wherein the encoded values computed for all of the VLANs defined within the computer network are loaded within the single attribute structure of the single GVRP PDU message for transmission from the selected port.

2. The intermediate network device as defined in claim 1 wherein the number base conversion encoding algorithm is a base-5 to base-2 number base conversion encoding algorithm.

3. The intermediate network device as defined in claim 2 wherein the number base conversion encoding algorithm is $(((((E_X \times 5 + E_{X+1}) \times 5 + E_{X+2}) \times 5 + E_{X+3}) \times 5 + E_{X+4}) \times 5 + E_{X+5}$ and wherein $E_x$ corresponds to the attribute event for the first VLAN in the set, $E_{x+1}$ corresponds to the attribute event for the second VLAN in the set, $E_{x+2}$ corresponds to the attribute event for the third VLAN in the set, $E_{x+3}$ corresponds to the attribute event for the fourth VLAN in the set, $E_{x+4}$ corresponds to the attribute event for the fifth VLAN in the set, and $E_{x+5}$ corresponds to the attribute event for the sixth VLAN in the set.

4. The intermediate network device as defined in claim 1 wherein the compact-GVRP encoder/decoder unit is configured to decode an encoded value contained in a field in a compact-GVRP PDU message, that was encoded using the number base conversion encoding algorithm, to yield attribute event information for a set of VLANs.

5. The intermediate network device as defined in claim 1 wherein the compact-GVRP application component is configured to generate and send a GVRP PDU message containing a just_kidding message.

6. The intermediate network device as defined in claim 5 further comprising:
 a leave timer;
 a just_kidding timer; and
 a just_kidding state machine,
 wherein the just_kidding state machine is configured to start the leave timer and to restart the just_kidding timer upon sending the GVRP PDU message containing the just_kidding message.

7. The intermediate network device as defined in claim 6 comprising:
 a leave_all timer; and
 a leave_all state machine,
 wherein the leave_all state machine is configured to enter an active state upon sending the GVRP PDU message containing the just_kidding message and the compact-GVRP application component is configured to generate and send a GVRP PDU message that is configured to cause network entities that receive it to respond with one or more GVRP PDU messages.

8. The intermediate network device as defined in claim 7 wherein the leave timer is set to a high value relative to the leave_all timer.

9. The intermediate network device as defined in claim 7 comprising:
 a mode selection unit configured to be in one of a compatible mode, a fast compact mode or a slow compact mode,
 wherein the mode selection unit is configured to enter the compatible mode if after the compact-GVRP application component sends the GVRP PDU message containing a just_kidding message and the mode selection unit is either in the fast compact mode or the slow compact mode and the compact-GVRP application component receives a conventional GVRP PDU message.

10. The intermediate network device as defined in claim 7 comprising:
 a port partner variable configured to hold a source identifier,
 wherein the compact-GVRP application component is configured to place the source identifier in the port partner variable upon processing a received GVRP PDU message containing a negotiation message with a source identifier.

11. The intermediate network device as defined in claim 10 wherein the compact-GVRP application is configured to enter a slow compact mode upon processing a received GVRP PDU message containing a negotiation message with a source identifier that does not match the content of the port partner variable.

12. The intermediate network device as defined in claim 10 wherein the compact-GVRP application is configured to enter a fast compact mode upon processing a received GVRP PDU message containing a negotiation message with a source identifier that matches the content of the port partner variable.

13. The intermediate network device as defined in claim 1 wherein the compact-GVRP application component is configured to generate a mixed format GVRP PDU message containing a conventional attribute structure as well as fields loaded with the encoded values.

14. The intermediate network device as defined in claim 1 wherein the VLANs defined within the computer network include more than 373 different VLANs.

15. In an intermediate node having a plurality of ports for sending and receiving network messages to and from entities of a computer network at least some of which are segregated into a plurality of virtual local area network (VLANs) defined within the computer network, a method for conveying VLAN membership information comprising:
 for a given set of VLANs defined within the computer network, computing, by the intermediate node, an encoded value, in accordance with a number base conversion encoding algorithm that encodes a plurality of attribute events that are each associated with a different VLAN of the given set of VLANs into each encoded value; and
 loading, by the intermediate node, each encoded value into a separate field within a single attribute structure of a single GVRP protocol data unit (PDU) message, wherein encoded values for all of the VLANs defined within the computer network are loaded into the single attribute structure of the single GVRP PDU message for transmission at one or more ports in the plurality of ports.

16. The method as defined in claim 15 further comprising:
 decoding an encoded value, that was encoded using the number base conversion encoding algorithm and is contained in a compact-GVRP PDU message, to yield attribute event information for a set of VLANs.

17. The method as defined in claim 15 further comprising:
 generating a GVRP PDU message containing a just_kidding message;
 sending the GVRP PDU message containing the just kidding message out one or more ports of the plurality of ports; and
 restarting a just_kidding timer.

18. The method as defined in claim 17 further comprising:
 entering a slow compact mode upon the expiration of the just_kidding timer and the non-receipt of a conventional GVRP PDU message.

19. The method as described in claim 17 further comprising:
 entering one of a slow compact mode or a fast compact mode;
 receiving a conventional GVRP PDU message; and
 reverting to a compatible mode.

20. The method as defined in claim 15 comprising:
 receiving a first compact-GVRP PDU message wherein the first compact-GVRP PDU message contains a first source identifier.

21. The method as defined in claim 20 comprising:
receiving a second compact-GVRP PDU message wherein the second compact-GVRP PDU message contains a second source identifier that does not match the first source identifier; and
entering a slow compact mode.

22. The method as defined in claim 20 comprising:
receiving a second compact-GVRP PDU message wherein the second compact-GVRP PDU message contains a second source identifier that matches the first source identifier; and
entering a fast compact mode.

23. The method as defined in claim 15 wherein the VLANs defined within the computer network include more than 373 different VLANs.

24. An apparatus having a plurality of ports for sending and receiving network messages to and from entities of a computer network at least some of which are segregated into a plurality of virtual local area network (VLANs) defined within the computer network, the apparatus comprising:
means for maintaining VLAN registration state for a selected port in response to receiving attribute events for the VLANs;
means for computing an encoded value, in accordance with a number base conversion encoding algorithm that encodes a plurality of attribute events that are each associated with a different VLAN of a given set of VLANs into each encoded value; and
means for loading each encoded value into a separate field within a single attribute structure of a single GVRP protocol data unit (PDU) message, wherein encoded values for all of the VLANs defined within the computer network are loaded into the single attribute structure of the single GVRP PDU message for transmission from a port in the plurality of ports.

25. A non-transitory computer readable medium comprising computer executable instructions for:
computing an encoded value, in accordance with number base conversion encoding algorithm that encodes a plurality of attribute events that are each associated with a different VLAN of a given set of VLANs into each encoded value; and
loading each encoded value into a separate field within a single attribute structure of a single GVRP protocol data unit (PDU) message, wherein encoded values for all of the VLANs defined within a computer network are loaded into the single attribute structure of the single GVRP protocol data unit (PDU) message for transmission from a port in a plurality of ports.

26. A method comprising:
maintaining virtual local area network (VLAN) registration state at a port of an intermediate network device in a computer network, where a plurality of VLANs are defined within the computer network;
grouping the plurality of VLANs defined within the computer network into sets of two or more different VLANs;
for each set of two or more different VLANs, computing an encoded value with an encoding algorithm that encodes attribute events associated with each VLAN of the two or more different VLANs of the set into a single encoded value for the set; and
loading each encoded value into a respective field within a single attribute structure of a VLAN Registration Protocol message such that encoded values encompassing all of the VLANs defined within the computer network are included within the single attribute structure of the VLAN Registration Protocol PDU; and
transmitting the VLAN Registration Protocol PDU message from the intermediate network device to one or more other network devices within the computer network.

27. The method as defined in claim 26 wherein the plurality of VLANs defined within the computer network includes more than 373 different VLANs.

28. The method as defined in claim 26 wherein the plurality of VLANs defined within the computer network includes at least 4094 different VLANs.

29. The method as defined in claim 26 wherein the encoding algorithm is a number base conversion encoding algorithm that takes values of attribute events associated with each VLAN that are represented in a first base, and converts the attribute events into a single encoded value that is represented in a second, different base.

30. An apparatus comprising:
means for maintaining virtual local area network (VLAN) registration state at a port of the apparatus, where a plurality of VLANs are defined within a computer network of the apparatus;
means for grouping the plurality of VLANs defined within the computer network into sets of two or more different VLANs;
means for computing, for each set of two or more different VLANs, an encoded value with an encoding algorithm that encodes attribute events associated with each VLAN of the two or more different VLANs of the set into a single encoded value for the set; and
means for loading each encoded value into a respective field within a single attribute structure of a VLAN Registration Protocol message such that encoded values encompassing all of the VLANs defined within the computer network are included within the single attribute structure of the VLAN Registration Protocol PDU; and
means for transmitting the VLAN Registration Protocol PDU message from the intermediate network device to one or more other network devices within the computer network.

31. The apparatus as defined in claim 30 wherein the plurality of VLANs defined within the computer network includes more than 373 different VLANs.

32. The apparatus as defined in claim 30 wherein the encoding algorithm is a number base conversion encoding algorithm that takes values of attribute events associated with each VLAN that are represented in a first base, and converts the attribute events into a single encoded value that is represented in a second, different base.

* * * * *